Jan. 23, 1945.  N. J. RAKAS  2,367,800
COMPOSITE ARTICLE
Filed Feb. 6, 1941
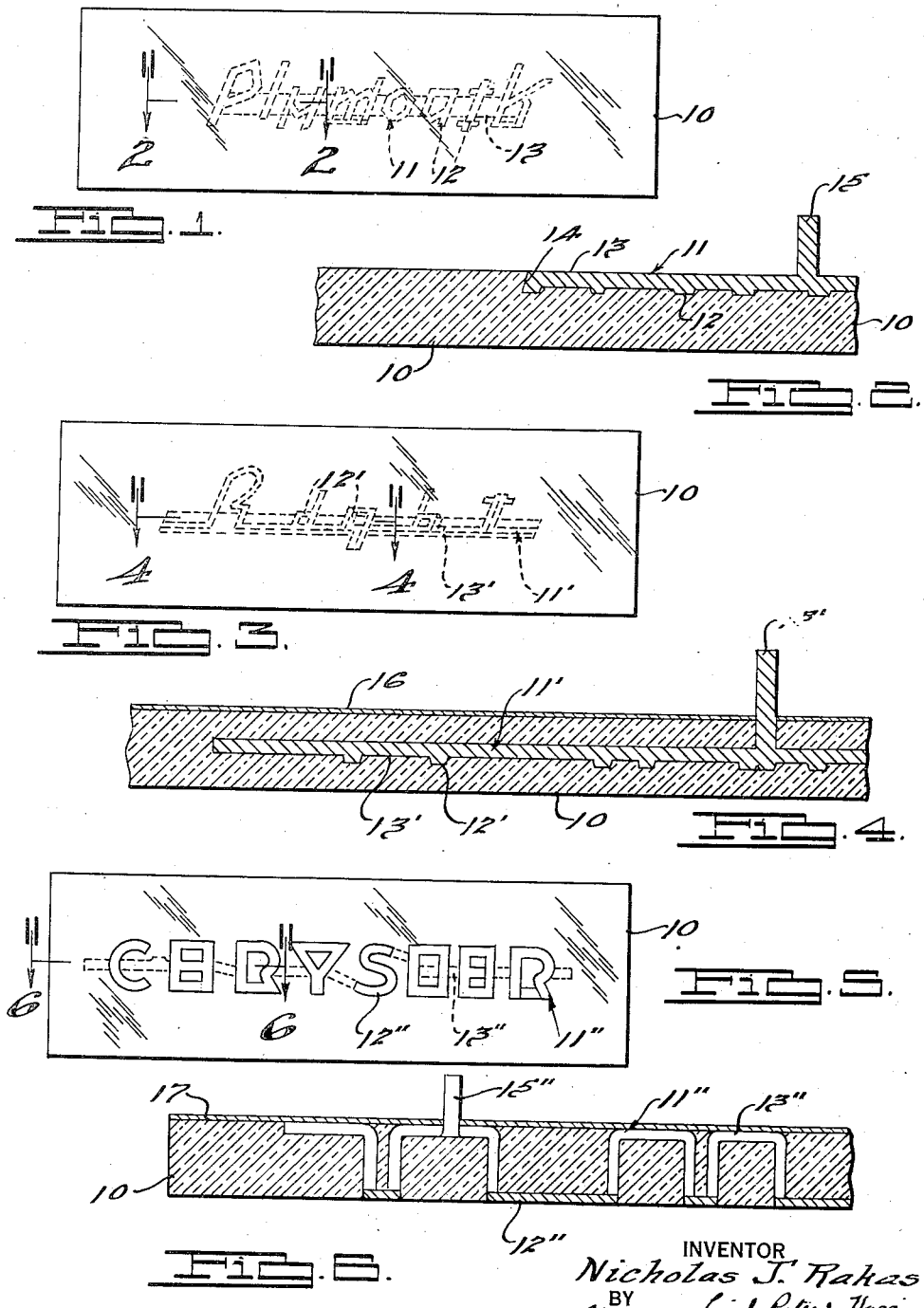
INVENTOR
Nicholas J. Rakas
BY
Harness, Dickey, Pierce & Harris
ATTORNEYS.

Patented Jan. 23, 1945

2,367,800

UNITED STATES PATENT OFFICE 2,367,800

COMPOSITE ARTICLE

Nicholas J. Rakas, Royal Oak, Mich., assignor to Chrysler Corporation, Highland Park, Mich., a corporation of Delaware Application February 6, 1941, Serial No. 377,764

3 Claims. (Cl. 40—125)

This invention relates to an improved article of manufacture.

An object of the invention is the provision of a composite article including a body of hardened plastic molded material and an indicia embedded therein, the indicia element being so embedded during molding of the plastic material.

Another object of the invention is the provision of means by which such an article can be attached to a support.

Further objects of the invention are the provision of a composite article including a body of hardened plastic material and an indicia bearing body embedded therein with portions of the bodies interlocked to prevent relative separation thereof, the bodies being so shaped as to effect the interlock as an incident to molding of the plastic material as aforesaid.

Other objects and advantages of the invention will be more apparent from the following description taken in connection with the accompanying drawing in which:

Fig. 1 is an elevational view of an article embodying the invention.

Fig. 2 is a sectional view taken on line 2—2 of Fig. 1.

Fig. 3 is a view similar to Fig. 1 but illustrating a modified form of the invention.

Fig. 4 is a sectional view taken on line 4—4 of Fig. 3.

Fig. 5 is a view similar to Figs. 1 and 3 but illustrating a further embodiment of the invention.

Fig. 6 is a sectional view taken on line 6—6 of Fig. 5.

Hardened plastic material can be advantageously used in the automotive industry for moldings, panels and the like, for example, and it is desirable in many instances that such parts include some form of indicia, either of an identifying nature or as a mere ornamentation and considerable difficulty has been experienced in maintaining the plastic body and indicia carrying body against relative separation and providing means by which the article can be securely attached to a support.

The various embodiments herein shown and described illustrate ways and means by which the difficulties heretofore encountered are overcome or substantially minimized. In carrying out the objects of the invention the indicia are preferably embedded in the hardened plastic material with a suitable projection protruding externally of the plastic body for attaching the part or article to a support.

This embedding can be effected by introducing a plastic material into a suitable mold cavity in contact with the indicia and permitting the material to solidify. This solidification may be brought about by cooling thermoplastic material, heating thermosetting material or by producing the required chemical change depending upon the character of the material used. Where it is desirable that the attaching means be integral with the indicia bearing body, the latter can be provided with a projection which is free from contact with the body of plastic material during the molding operation. This can be effected by providing a suitable opening in the wall bounding the mold cavity with the attachment forming projection disposed in the opening. Such an arrangement can serve also to index the indicia bearing body with respect to the mold cavity.

Referring to the drawing, the embodiments of the invention illustrated in Figs. 1 to 4 include a body of clear hardened plastic material 10. In Figs. 1 and 2 the numeral 11 designates an indicia bearing body, the indicia being a plurality of letters 12 tied together by a backing 13, it being understood that the latter maintains the letters in desired arrangement prior to assembly thereof in the article. The body 11 is embedded in the face of the article to be placed adjacent the support for the latter and flush with this face, with the letters 12 visible from the opposite or obverse face of the article. To prevent undesired relative separation of the parts 10 and 11, a portion of the indicia bearing body 11, preferably the tie backing 13, is provided with a reverse taper, as at 14, which forms an interlock with the material 10.

Formed integrally with the indicia bearing body 11 is a projection 15 disposed externally of the material 10 and by which the article can be attached to a support, this attaching means not being visible when the article is viewed from the front or normally exposed face.

The indicia bearing body 13 is preferably metallic, formed to shape by any suitable method such as by die casting. The metallic body is of such nature that it will not be affected by the relative high temperature to which it is subjected during the molding operation, it being understood that the material 10 is heated preparatory to the molding thereof.

Referring to the embodiment of Figs. 3 and 4, the article is formed as set forth above, the indicia bearing body 11' being so disposed with respect to the plastic material 10 as to be enveloped thereby. This relative disposition does not require the interlock of these bodies as set forth in connection with the prior embodiment, although it will be understood that an interlocking effect results from the attaching projection 15' extending through a portion of the material 10. If desired, a suitable coating 16 may be applied to the material 10 in order to provide a colored background for the indicia.

In the embodiment of Figs. 5 and 6 the material 10 is opaque and the indicia lettering 12" of the indicia 11" is embedded in the obverse face of the material, flush therewith. The tie backing 13" is so arranged as to effect an interlocking with the material 10' having portions thereof flush with the rear face of the latter. An attaching projection 15" is secured to one of the last mentioned portions of the tie backing 13". It will be understood that the opaque material 10' renders invisible the tie backing portions which are flush with the rear face of this material. If desired, a support backing such as 17 can be provided, this backing having an aperture through which the attaching projection 15" extends.

Although but several specific embodiments of the invention have herein been shown and described, it will be understood that various changes in the size, shape and arrangement of parts may be made without departing from the spirit of the invention or from the scope of the appended claims.

I claim:

1. In an article of manufacture adapted to be attached to a support, a body of plastic material having a face thereof viewably exposed when the article is attached to its support and a second face opposite the viewable face disposed adjacent the support when the article is attached thereto, a metallic body having an indicia bearing face embedded in and substantially flush with said viewable face, said metallic body having spaced parts thereof overlapping respective portions of said second face and disposed in a common plane and an attaching member secured to at least one of said metallic body parts adapted for engagement with the support for securing the article thereto.

2. In an article of manufacture adapted to be attached to a support, a body of plastic material having a face thereof viewably exposed when the article is attached to its support and having a second face opposite the viewable face, an ornament body having an ornamenting face embedded in and substantially flush with said viewable face, said ornament body including a first part extending from said ornamenting face toward said second face and a second part angled from said first part overlapping and so embedded in said second face as to be substantially flush therewith, and an attaching member carried by said second part projecting therefrom and adapted for engagement with the article support.

3. In an article of manufacture adapted to be attached to a support, a body of plastic material having a face thereof viewably exposed when the article is attached to its support and having a second face opposite the viewable face, an ornament body having an ornamenting face including spaced characters embedded in and substantially flush with said viewable face, said ornamental body having parts thereof extending from a plurality of said characters to and respectively overlapping portions of said second face, the parts of said body so overlapping said second face portions being disposed in a common plane, and fastening means carried by one of said parts adapted for cooperative engagement with the support for securing the article thereto.

NICHOLAS J. RAKAS.